(12) United States Patent
Huang et al.

(10) Patent No.: US 8,763,977 B2
(45) Date of Patent: Jul. 1, 2014

(54) STAND FOR DISPLAY DEVICE (75) Inventors: Chun-Ming Huang, Taipei (TW); Shih-Hsiung Yen, Taipei (TW); Jian-Yu Lin, Taipei (TW)

(73) Assignee: Compal Electronics, Inc., Taipei (TW)

( * ) Notice: Subject to any disclaimer, the term of this patent is extended or adjusted under 35 U.S.C. 154(b) by 73 days.

(21) Appl. No.: 13/550,608

(22) Filed: Jul. 17, 2012

(65) Prior Publication Data

US 2013/0068902 A1 Mar. 21, 2013

Related U.S. Application Data (60) Provisional application No. 61/537,052, filed on Sep. 20, 2011.

(51) Int. Cl.
*A47G 1/24* (2006.01)

(52) U.S. Cl.
USPC ........... 248/456; 248/447; 248/188.8; 16/326

(58) Field of Classification Search
USPC .............. 248/188.8, 455, 458, 677, 463, 447, 248/456, 688, 460; 40/747, 748; 16/326, 16/327; 361/679.01, 679.27, 679.21
See application file for complete search history.

(56) References Cited

U.S. PATENT DOCUMENTS

| | | | | |
|---|---|---|---|---|
| 1,913,899 A * | 6/1933 | Rodanet | ........................ | 16/326 |
| 3,643,292 A * | 2/1972 | Mayer | ............................ | 16/325 |
| 3,692,369 A * | 9/1972 | Chase | .......................... | 403/161 |
| 4,602,889 A * | 7/1986 | Mu-Shan | ........................ | 403/91 |
| 5,142,739 A * | 9/1992 | Lin | ................................ | 16/326 |
| 5,530,977 A * | 7/1996 | Wang | ................................ | 5/99.1 |
| 5,620,272 A * | 4/1997 | Sheng | .............................. | 403/96 |
| 5,814,000 A * | 9/1998 | Kilbey | ............................. | 602/16 |
| 6,003,831 A * | 12/1999 | Coleman | ...................... | 248/688 |
| 6,459,887 B2 * | 10/2002 | Okuda | ......................... | 455/90.1 |
| 6,829,807 B2 * | 12/2004 | Kim | ................................. | 16/322 |
| 6,993,808 B1 * | 2/2006 | Bennett et al. | ................... | 16/334 |
| 7,235,059 B2 * | 6/2007 | Mason et al. | ................... | 602/26 |
| 7,301,759 B2 * | 11/2007 | Hsiung | .................... | 361/679.27 |
| 7,340,801 B2 * | 3/2008 | Yamaguchi | ..................... | 16/368 |
| 7,421,762 B2 * | 9/2008 | Lu et al. | .......................... | 16/328 |
| 7,448,588 B2 * | 11/2008 | Sung | ............................. | 248/351 |
| 7,682,323 B2 * | 3/2010 | DeToro et al. | .................. | 602/16 |
| 7,735,797 B2 * | 6/2010 | Hu | ................................ | 248/371 |
| 7,753,336 B2 * | 7/2010 | Hu | ................................ | 248/688 |
| 7,975,970 B2 * | 7/2011 | Hu | ................................ | 248/136 |
| 8,079,166 B2 * | 12/2011 | Li et al. | ........................... | 40/748 |
| 8,266,834 B2 * | 9/2012 | Chen et al. | ...................... | 40/749 |
| 8,336,167 B2 * | 12/2012 | Kim | ................................ | 16/303 |
| 8,520,371 B2 * | 8/2013 | Peng et al. | .............. | 361/679.01 |
| 2007/0067957 A1 * | 3/2007 | Moore | ............................ | 16/326 |
| 2011/0164358 A1 * | 7/2011 | Duan et al. | ............... | 361/679.01 |

* cited by examiner

*Primary Examiner* — Terrell McKinnon
*Assistant Examiner* — Daniel J Breslin
(74) *Attorney, Agent, or Firm* — CKC & Partners Co., Ltd.

(57) ABSTRACT

A stand for a display device is provided and includes a housing having an accommodating groove, a hinge structure including a first board and two second boards, and a latch including an operation portion. The first board is fixed on a backboard of the display device and has a positioning groove. The two second boards are rotatably connected respectively to two ends of the first board and each is fixed on the housing. The latch is flexibly placed on the housing and is aligned with the first board. The operation portion is exposed through the accommodating groove. The fastening portion is selectively engaged with the positioning groove by releasing a spring force of a spring connected to the latch. When the operation portion is moved in a direction away from the first board, the fastening portion is disengaged from the positioning groove by compressing the spring.

11 Claims, 12 Drawing Sheets

STAND FOR DISPLAY DEVICE

RELATED APPLICATIONS

The application claims priority to Provisional Application Ser. No. 61/537,052 filed on Sep. 20, 2011, which is herein incorporated by reference.

BACKGROUND

1. Technical Field

The present disclosure relates to a stand for a display device, and more particularly to a stand for a display device capable of adjusting and limiting angles.

2. Description of Related Art

In recent years, liquid crystal displays (LCDs) have been extensively used in various consumer electronic products and are gradually replacing cathode ray tubes (CRTs). The replacing of CRTs with LCDs is occurring due to the fact that LCDs have the advantages of high definition, small volume, low weight, low radiation, and low power consumption compared with CRTs. LCDs are used, for example, in most televisions, monitors, cellular phones, and portable computers on the market. Therefore, LCDs have become indispensable electronic products for work or pleasure.

An LCD may include a stand. The stand may be fixed on a backboard of the LCD, such that the LCD can be placed on a table and maintained at a particular inclination by utilizing the stand. By adjusting the inclination, users can see images displayed by the LCD utilizing an optimum viewing angle. The stand is often connected to the backboard of the LCD by a hinge structure, such that the stand can be pivoted on the backboard of the LCD, and users can adjust the included angle between the stand and the backboard of the LCD as desired.

When the LCD needs to be packaged or moved to another place, users may press the stand to a position substantially parallel to the backboard of the LCD to allow for convenient packaging or moving. However, the material of the hinge structure is metal, and the material of the housing of the stand is plastic. When the stand is pressed to the position parallel to the backboard of the LCD, the stand is easily pivoted on the backboard of the LCD by an excessive amount due to too much force being exerted by a user, such that the stand may be damaged.

Furthermore, with the conventional configuration, when a user adjusts the included angle between the backboard of the LCD and the stand or moves the LCD, the stand may be completely folded inadvertently when an excessive force is used by the user when pushing the LCD. As a result, the LCD may collapse and be damaged.

SUMMARY

An aspect of the present invention is to provide a stand for a display device.

In an embodiment of the present invention, a stand for a display device includes a housing having an accommodating groove, a hinge structure including a first board and two second boards, and a latch flexibly placed on the housing and aligned with the first board. The first board is fixed on a backboard of the display device and has a positioning groove. The two second boards are rotatably connected respectively to two ends of the first board and each is fixed on the housing. The latch includes an operation portion and a fastening portion. The operation portion is exposed through the accommodating groove. The fastening portion is selectively engaged with the positioning groove by releasing a spring force of a spring connected to the latch. An included angle is formed between the housing and the backboard of display device when the fastening portion is engaged with the positioning groove. When the operation portion is moved in a direction away from the first board, the fastening portion is disengaged from the positioning groove by compressing the spring connected to the latch, such that the housing is pivoted to a position parallel to the backboard of display device.

In an embodiment of the present invention, the positioning groove includes a first sidewall, a second sidewall, and a groove bottom. When the fastening portion is located in the positioning groove, the fastening portion is selectively abutted against the first sidewall, the second sidewall, or a portion of the groove bottom located between the first and second sidewalls.

In an embodiment of the present invention, the fastening portion has a contact surface, and the first board has an axle center. When the contact surface is abutted against the first sidewall, the contact surface is located on a connecting line formed by the first sidewall and the axle center.

In an embodiment of the present invention, the length of the accommodating groove is greater than the length of the operation portion, such that the operation portion is movable in the accommodating groove.

In an embodiment of the present invention, the stand further includes a latch fixing base located between the latch and the housing. The latch fixing base is fixed on the housing and includes two extending wings respectively fixed on the two second boards.

In an embodiment of the present invention, the stand further includes a strengthening board fixed on the housing, such that the two second boards, the latch fixing base, and the latch are sandwiched between the strengthening board and the housing.

In an embodiment of the present invention, the latch fixing base includes a hollow pillar, the strengthening board has a fixing hole, and the hollow pillar is aligned with the fixing hole.

In an embodiment of the present invention, the stand further includes a fixing member extending through the fixing hole and coupled to the hollow pillar.

In an embodiment of the present invention, the latch fixing base includes a stop wall protruding into the positioning groove for abutting against the latch.

In an embodiment of the present invention, the latch further includes a cushion body fixed on the fastening portion for abutting against the first sidewall, the second sidewall, or the groove bottom.

In an embodiment of the present invention, the material of the cushion body includes plastic or rubber.

In the aforementioned embodiments of the present invention, the latch is flexibly placed on the housing and the operation portion is exposed through the accommodating groove. Therefore, the position of the latch can be moved by the operation portion. In addition, the fastening portion can be selectively abutted against the first sidewall, the second sidewall, or the groove bottom, such that the different included angles can be formed between the housing and the backboard of display device. When the operation portion is moved in the direction away from the first board, the fastening portion can be disengaged from the positioning groove. At the same time, the housing can be pivoted to a position substantially parallel to the backboard of display device.

As a result, when the stand for a display device is pivoted to the position parallel to the backboard of the display device, the stand is not easily pivoted on the backboard of the display device in an excessive manner due to the exertion of a disproportionate amount of force by the user. Hence, the stand is not easily damaged when pivoted to such a position parallel to the backboard of the display device. Furthermore, when adjusting a viewing angle of the display device or when moving the display device, the stand is not easily folded due to an excessive force being applied to the display device. Hence, the display device can be prevented from collapsing and being damaged.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
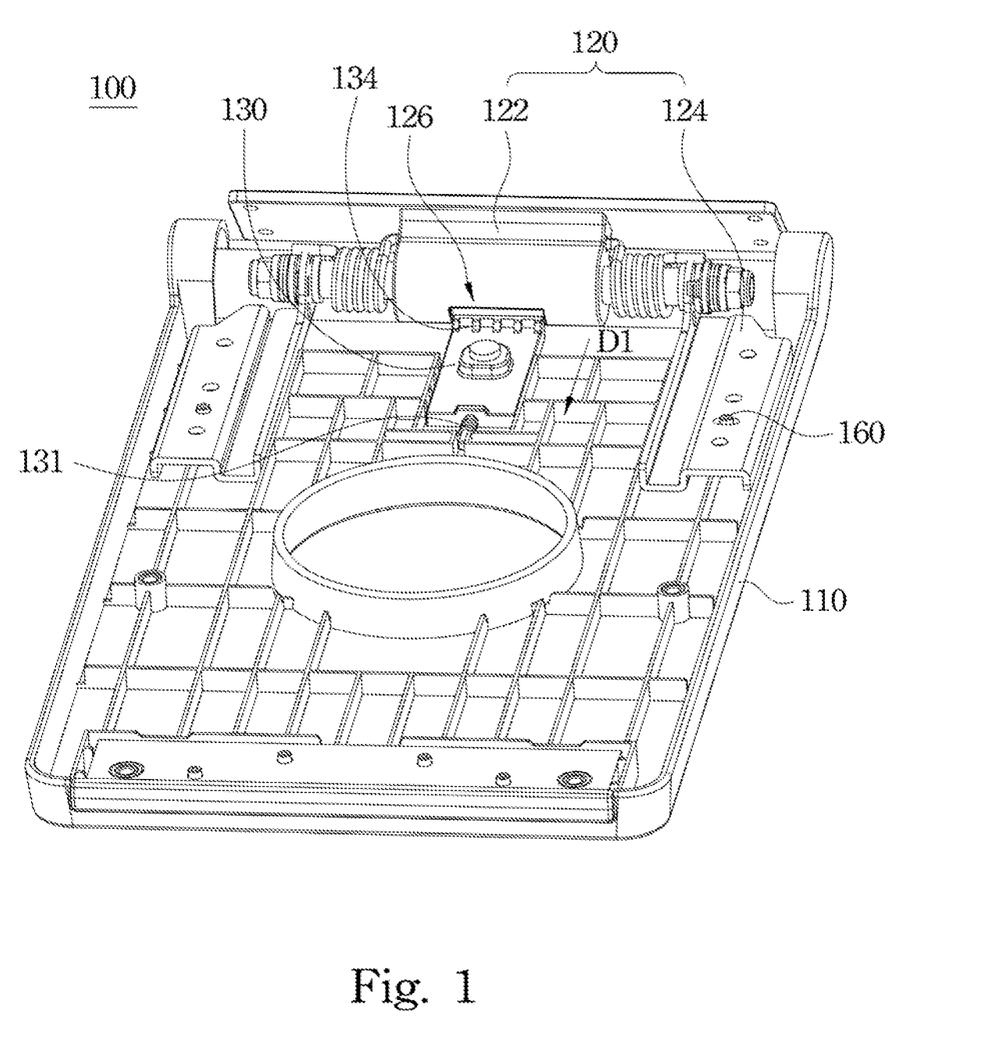
FIG. 1 is a perspective view of a stand for a display device of an embodiment of the present invention.
Figure 2:
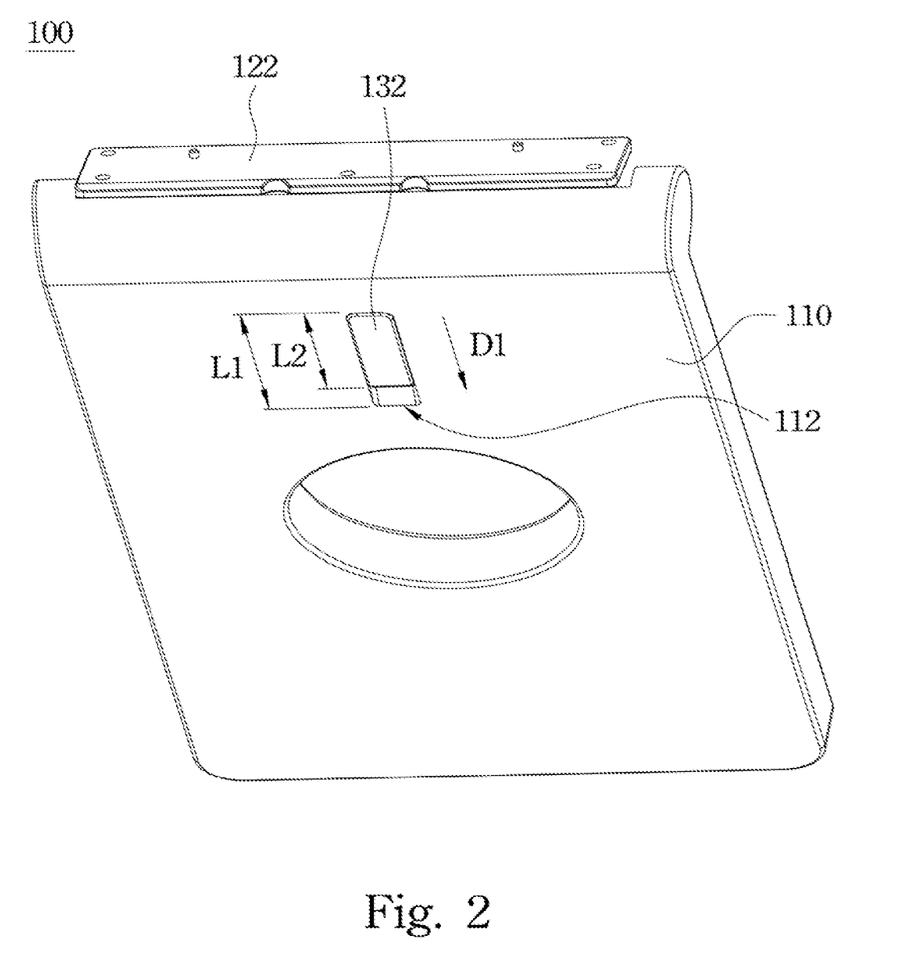
FIG. 2 is another perspective view of the stand for a display device shown in FIG. 1.

FIG. 1 is a perspective view of a stand 100 for a display device of an embodiment of the present invention. FIG. 2 is another perspective view of the stand 100 for a display device shown in FIG. 1. As shown in FIG. 1 and FIG. 2, the stand 100 for a display device includes a housing 110, a hinge structure 120, and a latch 130. The housing 110 has an accommodating groove 112. The hinge structure 120 includes a first board 122 and two second boards 124. The first board 122 has a positioning groove 126, and is fixed on a backboard of a display device (not shown). The two second boards 124 are rotatably connected respectively to two ends of the first board 122, and each of the second boards 124 is fixed on the housing 110 by a fixing member 160 (e.g., a screw). The material of the housing 110 may include plastic, and the material of the hinge structure 120 may include metal.

The latch 130 is flexibly placed on the housing 110 and substantially aligned with the first board 122, and includes an operation portion 132 and a fastening portion 134. The operation portion 132 is exposed through the accommodating groove 112, and the fastening portion 134 is selectively engaged with the positioning groove 126 of the first board 122 by releasing a spring force of a spring 131 connected to the latch 130. The length L1 of the accommodating groove 112 is greater than the length L2 of the operation portion 132, such that the operation portion 132 can be moved in the accommodating groove 112 (i.e., the operation portion 132 is movable in the accommodating groove 112). Consequently, when the operation portion 132 is moved in a direction D1 away from the first board 122 by a force, the fastening portion 134 can be disengaged from the positioning groove 126 of the first board 122 while the operation portion 132 compresses the spring 131 connected to the latch 130.

Figure 3:
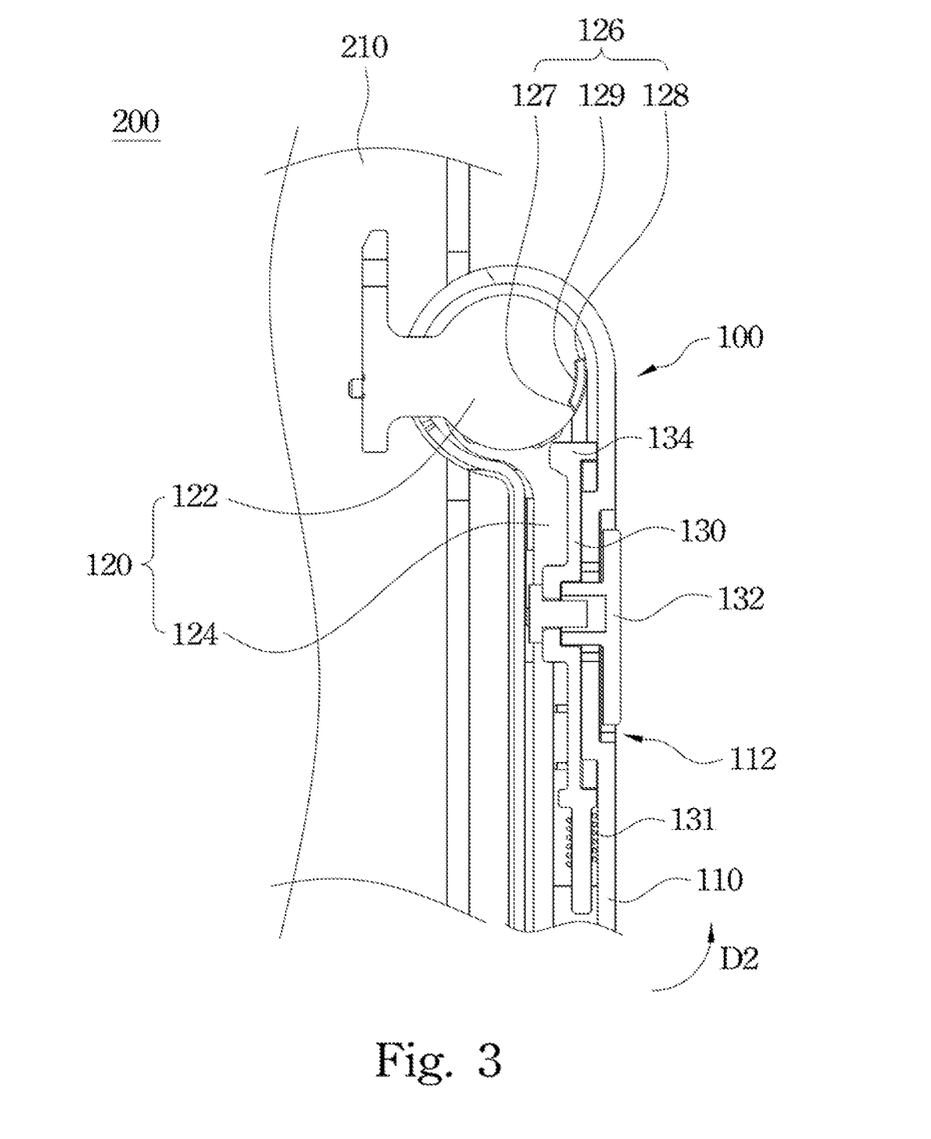
FIG. 3 is a cross sectional view of the stand for a display device shown in FIG. 1, in which the stand is shown in a state fixed on a backboard of a display device.

FIG. 3 is a cross sectional view of the stand 100 for a display device shown in FIG. 1, in which the stand 100 is shown in a state fixed on a backboard 210 of a display device 200. The backboard 210 of the display device 200 may be a backboard of a screen on a monitor, a backboard of a screen on a computer including the display device 200, or a backboard of a screen on a touch panel. The first board 122 may be fixed on the backboard 210 of the display device 200 by utilizing a snap-fitting configuration therewith or by utilizing screws. The positioning groove 126 includes a first sidewall 127, a second sidewall 128, and a groove bottom 129. As shown in FIG. 3, when the stand 100 is in a folded state, the housing 110 is substantially parallel to the backboard 210 of the display device 200. Moreover, when the stand 100 is in the folded state, the fastening portion 134 of the latch 130 is abutted against the first board 122 by the spring force of the spring 131, but the fastening portion 134 does not enter the positioning groove 126.

Figure 4:
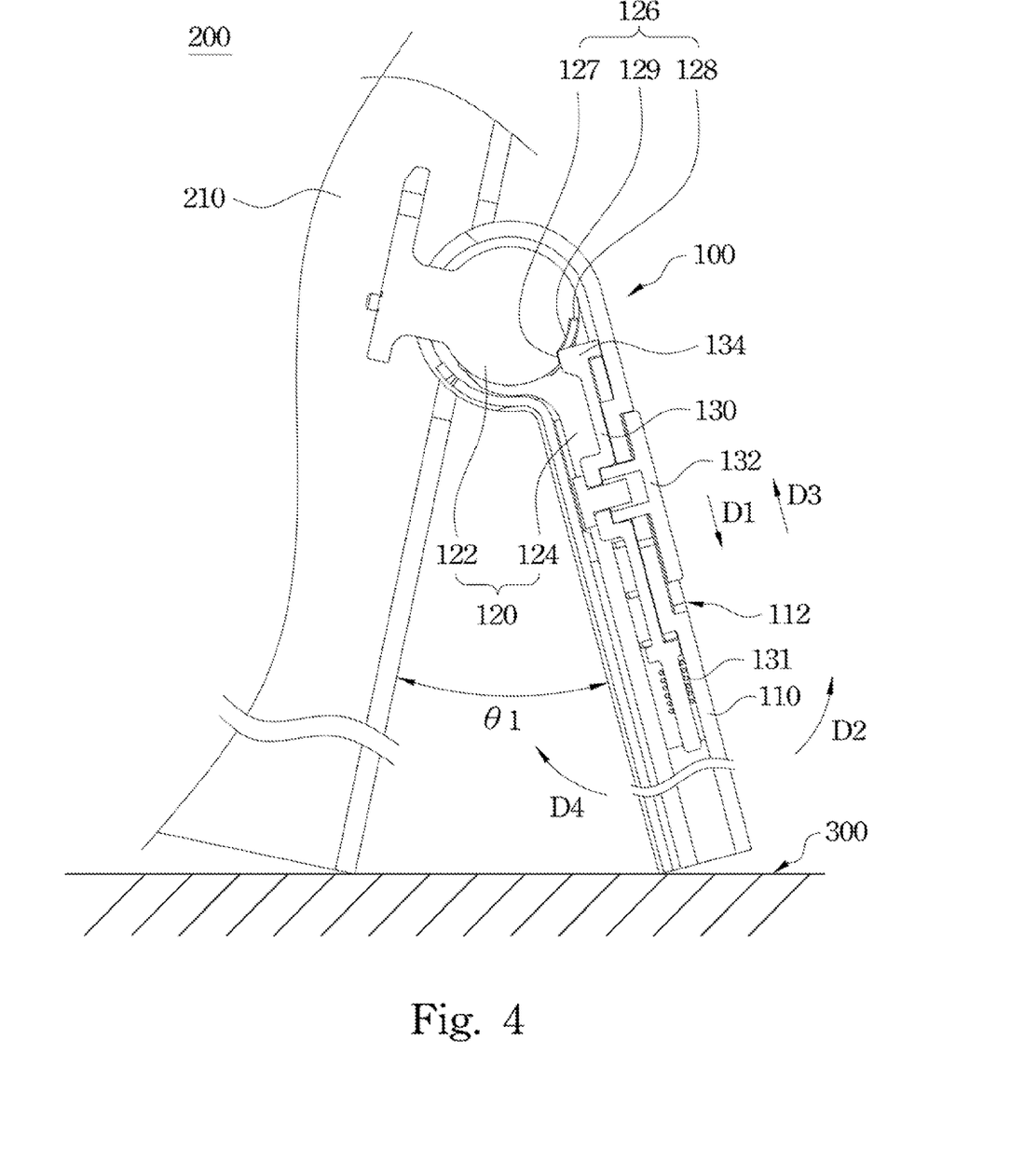
FIG. 4 is a cross sectional view of the stand for a display device shown in FIG. 3 when a fastening portion is abutted against a first sidewall.

When the housing 110 is pivoted in a direction D2 away from the backboard 210 of the display device 200, the fastening portion 134 of the latch 130 can enter the positioning groove 126 by the spring force of the spring 131, as shown in FIG. 4.

FIG. 4 is a cross sectional view of the stand 100 for a display device shown in FIG. 3 when the fastening portion 134 is abutted against the first sidewall 127. As shown in FIG. 3 and FIG. 4, when the housing 110 is pivoted in the direction D2, the fastening portion 134 of the latch 130 enters the positioning groove 126 in a direction D3 by the spring force of the spring 131, such that the stand 100 is in an open state. As a result, the stand 100 and the backboard 210 of the display device 200 can stand on a bearing surface 300. Furthermore, when the fastening portion 134 is located in the positioning groove 126, the fastening portion 134 can be selectively abutted against the first sidewall 127, the second sidewall 128, or a portion of the groove bottom 129 located between the first sidewall 127 and the second sidewall 128, in accordance with practical requirements.

That is to say that the fastening portion 134 of the latch. 130 can be moved in a range between the first sidewall 127 and the second sidewall 128, such that an included angle between the stand 100 and the backboard 210 of the display device 200 can be adjusted by the user. In FIG. 4, the fastening portion 134 is abutted against the first sidewall 127 of the positioning groove 126, such that an included angle θ1 is formed between the housing 110 and the backboard 210 of display device. The included angle θ1 refers to the smallest working angle of the stand 100, and the housing 110 can be continuously pivoted toward the second sidewall 128 in the direction D2, as shown in FIG. 5.

Figure 5:
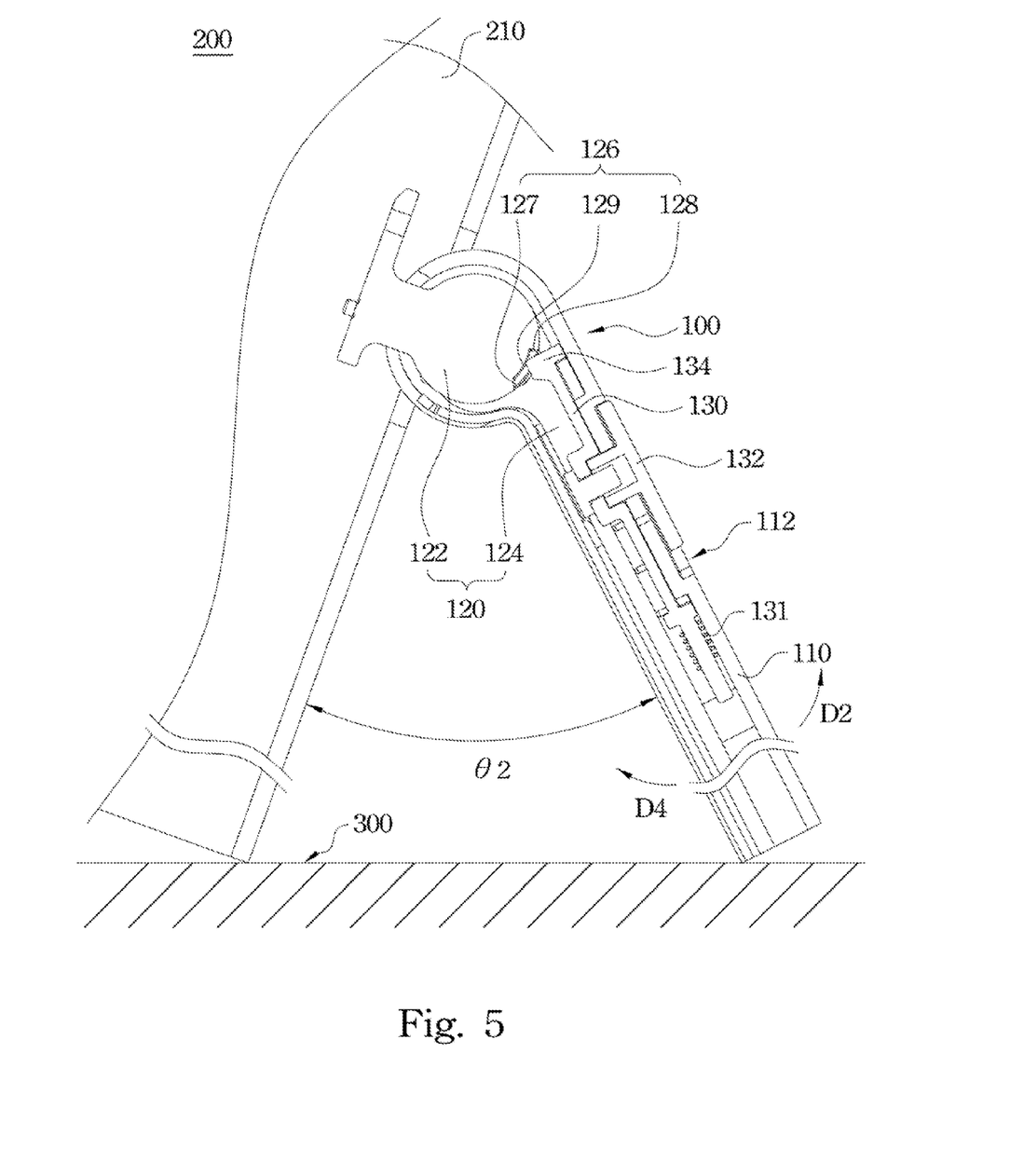
FIG. 5 is a cross sectional view of the stand for a display device shown in FIG. 3 when the fastening portion is abutted against a second sidewall.

FIG. 5 is a cross sectional view of the stand 100 for a display device shown in FIG. 3 when the fastening portion 134 is abutted against the second sidewall 128. As shown in FIG. 5, the fastening portion 134 is abutted against the second sidewall 128 of the positioning groove 126, and an included angle θ2 is formed between the housing 110 and the backboard 210 of the display device 200. The included angle θ2 refers to the largest working angle of the stand 100. In this state, the housing 110 can not be continuously pivoted on the first board 122 in the direction D2, and only can be pivoted in a direction D4.

Referring back to FIG. 4, in this embodiment, when the housing 110 needs to be pivoted in the direction D4 to the folded state shown in FIG. 3, since the fastening portion 134 is abutted against the first sidewall 127 of the positioning groove 126 in the state shown in FIG. 4, a force needs to be applied by the user to the operation portion 132 in the direction D1, such that the operation portion 132 is moved in the direction D1 away from the first board 122. As a result, the fastening portion 134 of the latch 130 can be moved with the operation portion 132 and disengaged from the positioning groove 126. Next, a force is applied by the user to the housing 110 in the direction D4, such that the housing 110 is pivoted in the direction D4 to a position substantially parallel to the backboard 210 of display device, as shown in FIG. 3.

In this embodiment, the latch 130 is flexibly placed on the housing 110 and the operation portion 132 is exposed through the accommodating groove 112. Therefore, the position of the latch 130 can be moved by the operation portion 132. In addition, the fastening portion 134 can be selectively abutted against the first sidewall 127, the second sidewall 128, or a portion of the groove bottom 129 located between the first and second sidewalls 127, 128, such that different included angles can be formed between the housing 110 and the backboard 210 of the display device. When the fastening portion 134 is abutted against the first board 122 and not located in the positioning groove 126, the stand 100 is in the folded state, as shown in FIG. 3. When the fastening portion 134 is located in the positioning groove 126, the stand 100 is in the open (working) state, as shown in FIG. 4 and FIG. 5.

Furthermore, the stand 100 not only can be folded to the position substantially parallel to the backboard 210 of the display device, but when the stand 100 is changed from the open state to the folded state, a force needs to be applied by the user to the operation portion 132 to move the latch 130 in the direction D1 away from the first board 122, after which the fastening portion 134 can be disengaged from the positioning groove 126. Therefore, when the display device 200 includes the stand 100, even though the hardness of the material of the hinge structure 120 is greater than the hardness of the material of the housing 110 (for example, the hinge structure 120 may be made of a material including metal and the housing 110 may be made of a material including plastic), the stand 100 is not easily pivoted on the backboard 210 of the display device 200 by an excessive amount due to too much force being applied by the user. As a result, the housing 110 is prevented from being damaged by such excessive pivoting of the stand 100. Moreover, when adjusting a viewing angle of the display device 200 or moving the display device 200, the stand 100 is not easily folded due to an excessive force being applied to the display device 200. Hence, the display device 200 can be prevented from collapsing and being damaged.

It is to be noted that the connection relationship of the aforementioned elements will not be repeated in the following description, and only aspects related to other types of the fastening portion 134 and the positioning groove 126 will be described.

Figure 6:
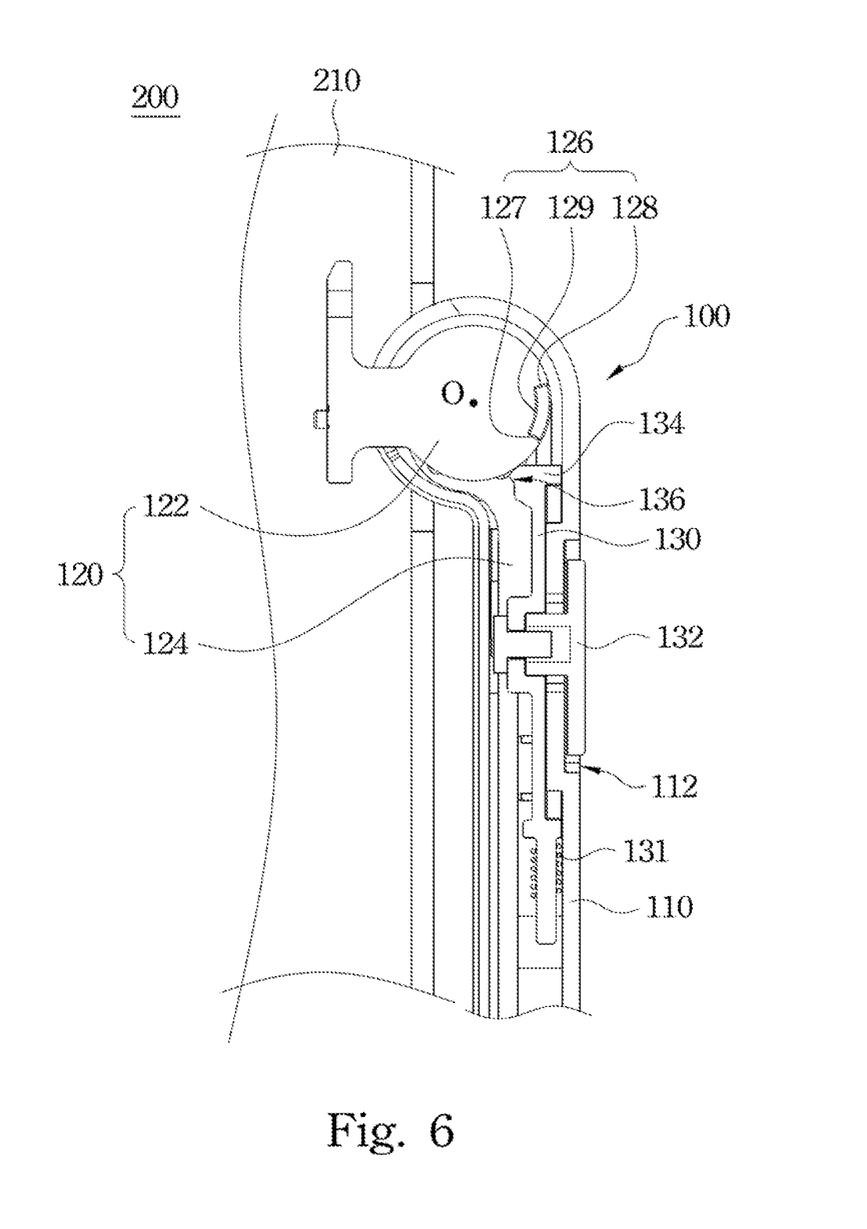
FIG. 6 is a cross sectional view of a stand for a display device of an embodiment of the present invention, in which the stand is shown in a state fixed on a backboard of a display device.
Figure 7:
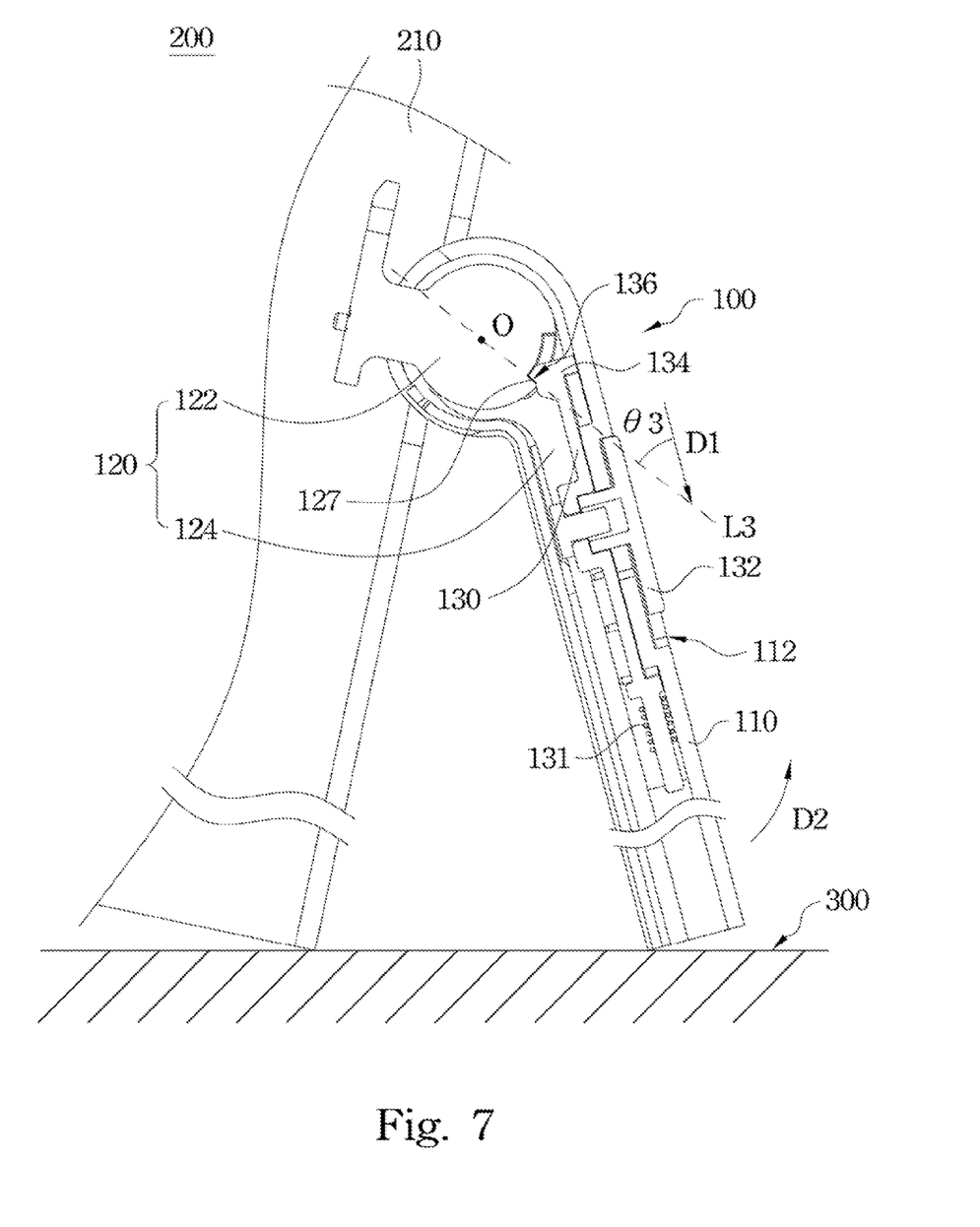
FIG. 7 is a cross sectional view of the stand for a display device shown in FIG. 6 when a fastening portion is abutted against a first sidewall.

FIG. 6 is a cross sectional view of a stand 100 for a display device of an embodiment of the present invention, in which the stand 100 is shown in a state fixed on a backboard 210 of a display device 200. FIG. 7 is a cross sectional view of the stand 100 for a display device shown in FIG. 6 when a fastening portion 134 is abutted against a first sidewall 127. As shown in FIG. 6 and FIG. 7, the stand 100 for a display device includes the housing 110, the hinge structure 120, and the latch 130. The fastening portion 134 has a contact surface 136, and the first board 122 has an axle center O. The difference between this embodiment and the aforementioned embodiments is that when the contact surface 136 is abutted against the first sidewall 127, the contact surface 136 is located on a connecting line L3 formed by the first sidewall 127 and the axle center O.

In this embodiment, when the contact surface 136 of the fastening portion 134 is abutted against the first sidewall 127, an included angle θ3 is formed between an imaginary line which indicates the direction D1 and is parallel with the operation portion 132 and the connecting line L3, and with this configuration, the operation portion 132 can not be moved in the direction D1. That is, the fastening portion 134 is obstructed by the first sidewall 127. When it is desired to change the stand 100 from the open state to the folded state, the housing 110 needs to be pivoted first in the direction D2, such the fastening portion 134 can be disengaged from the first sidewall 127, as shown in FIG. 8.

Figure 8:
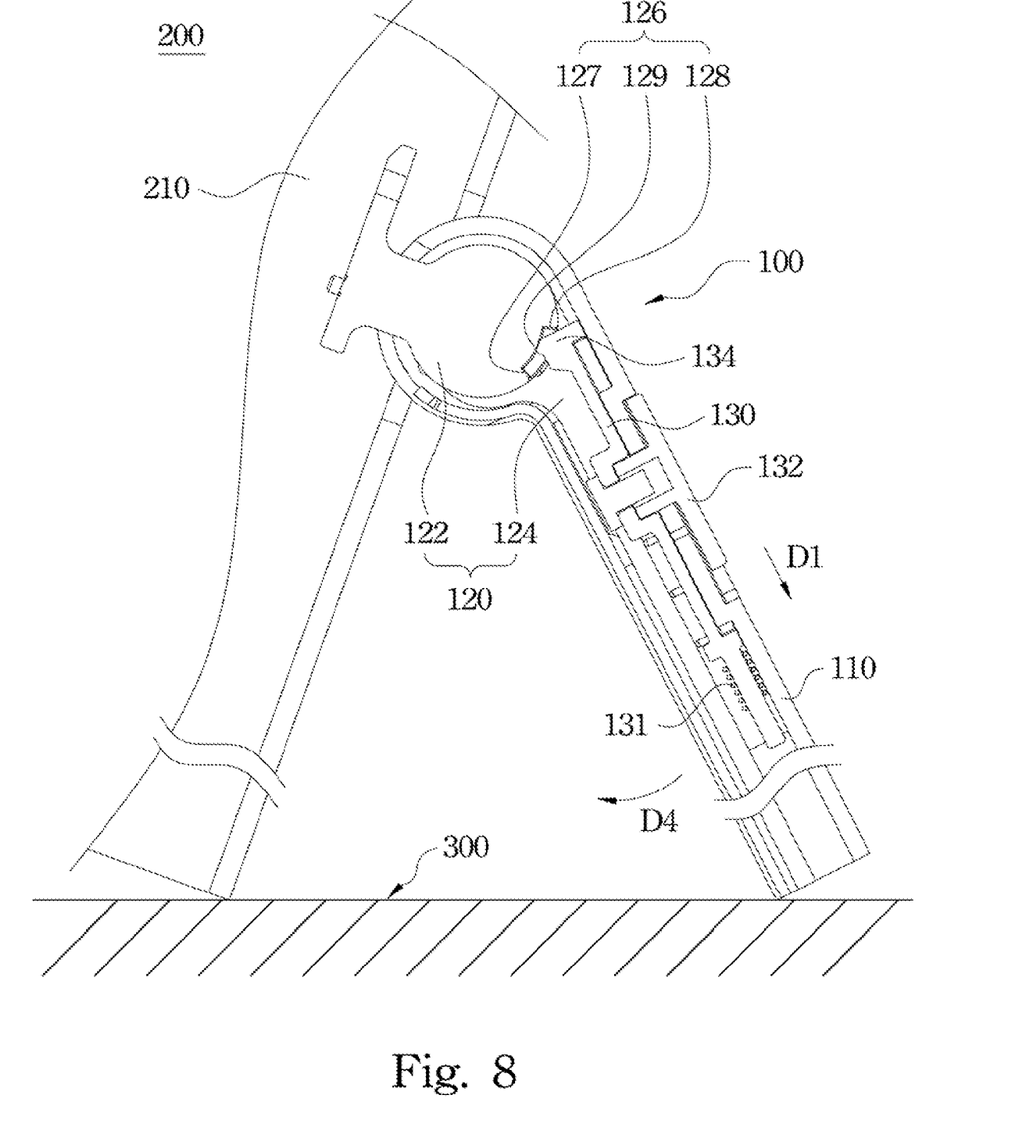
FIG. 8 is a cross sectional view of the stand for a display device shown in FIG. 6 when the fastening portion is disengaged from the first sidewall.

FIG. 8 is a cross sectional view of the stand 100 for a display device shown in FIG. 6 when the fastening portion 134 is disengaged from the first sidewall 127. After the housing 110 is pivoted in the direction D2 to the state shown in FIG. 8, a force is applied by the user to the operation portion 132 in the direction D1, such that the latch 130 is moved in the direction D1 facing away from the first board 122. As a result, the fastening portion 134 can be disengaged from the positioning groove 126. Subsequently, another force is applied by the user to the housing 110 in the direction D4, such that the housing 110 is pivoted in the direction D4 to a position substantially parallel to the backboard 210 of the display device 200, as shown in FIG. 6. Consequently, the stand 100 is not easily pivoted on the backboard 210 of the display device 200 in an excessive manner due to the exertion of a disproportionate amount of force by the user. Hence, the housing 110 is not easily damaged. Furthermore, when adjusting a viewing angle of the display device 200 or when moving the display device 200, the stand 100 is not easily folded due to an excessive force being applied to the display device 200. Hence, the display device 200 can be prevented from collapsing and being damaged.

It is to be noted that the connection relationship of the aforementioned elements will not be repeated in the following description, and only aspects related to elements for strengthening the housing 110 and the latch 130 will be described.

Figure 9:
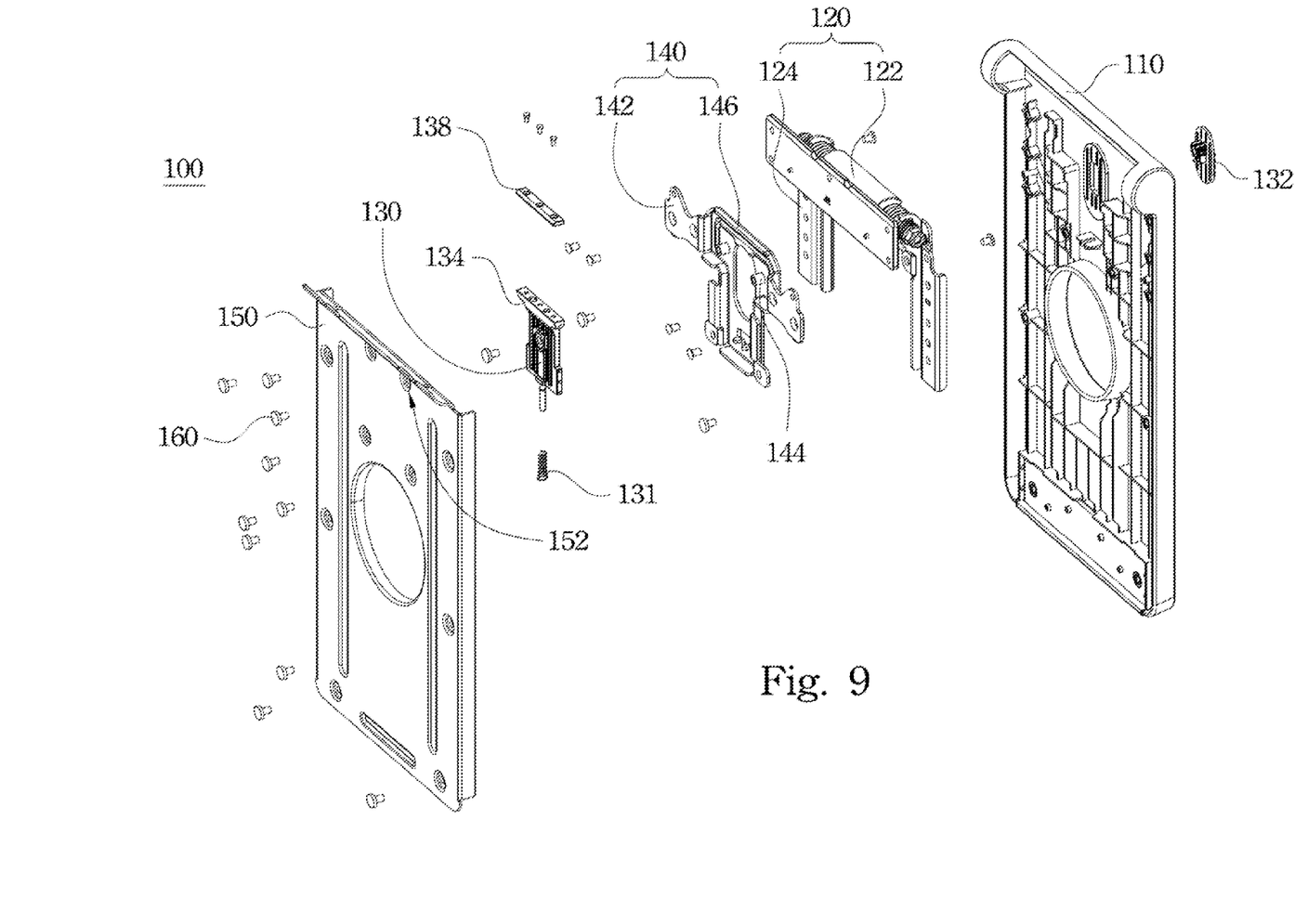
FIG. 9 is an exploded perspective view of a stand for a display device of an embodiment of the present invention.
Figure 10:
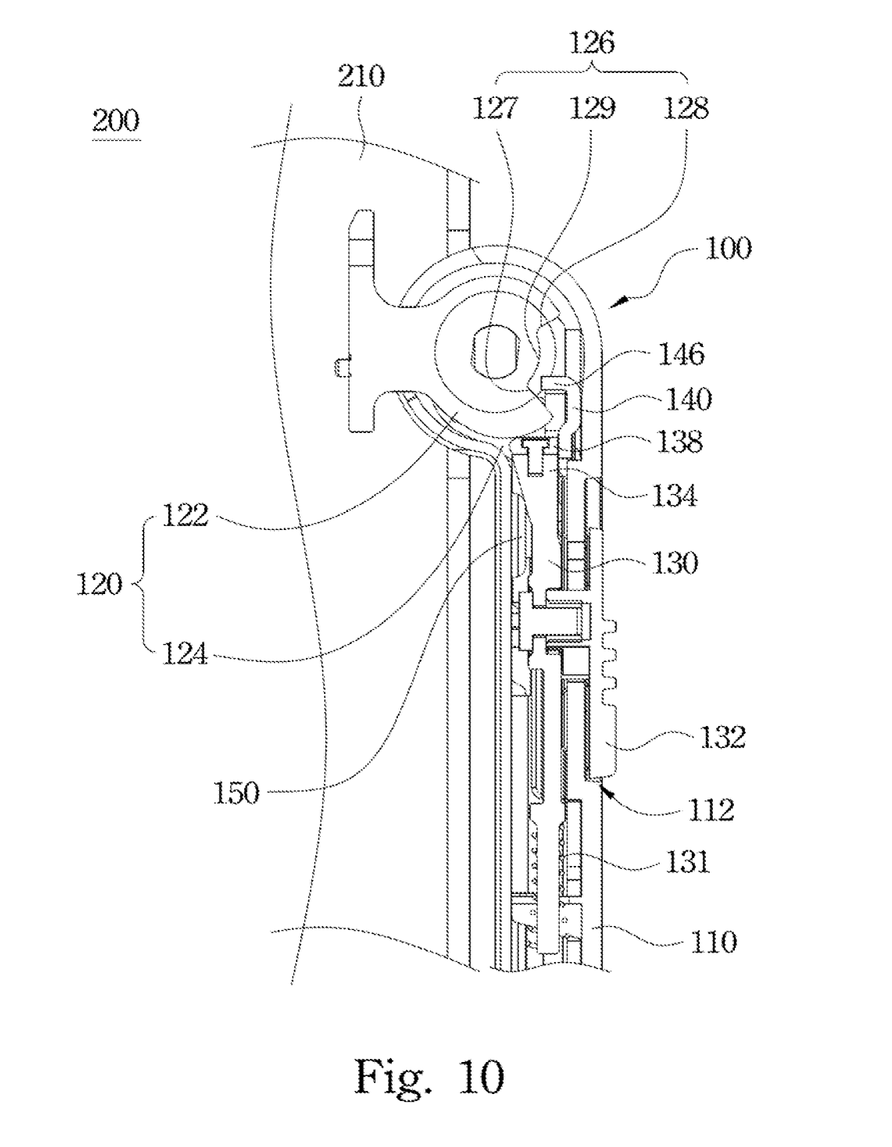
FIG. 10 is a cross sectional view of the stand for a display device shown in FIG. 9, in which the stand is shown in a state fixed on a backboard of a display device.

FIG. 9 is an exploded perspective view of a stand 100 for a display device of an embodiment of the present invention. FIG. 10 is a cross sectional view of the stand 100 for a display device shown in FIG. 9, in which the stand 100 is shown in a state fixed on a backboard 210 of a display device 200. As shown in FIG. 9 and FIG. 10, the stand 100 includes the housing 110, the hinge structure 120, and the latch 130. The difference between this embodiment and the aforementioned embodiments is that the stand 100 of display device further includes a latch fixing base 140 and a strengthening board 150. The material of the latch fixing base 140 and the strengthening board 150 may include metal. By utilizing the latch fixing base 140 and the strengthening board 150, the strength of the stand 100 can be improved, such that the housing 110 is not easily damaged when being pivoted.

The latch fixing base 140 is located between the latch 130 and the housing 110 and is fixed on the housing 110. The latch fixing base 140 includes two extending wings 142 and a stop wall 146. The two extending wings 142 are respectively fixed on the two second boards 124. The stop wall 146 protrudes into the positioning groove 126 to abut against the latch 130. The strengthening board 150 is fixed on the housing 110, such that the two second boards 124, the latch fixing base 140, and the latch 130 are sandwiched between the strengthening board 150 and the housing 110.

In addition, the latch fixing base 140 may further include a hollow pillar 144. The strengthening board 150 has a fixing hole 152, and the hollow pillar 144 is aligned with the fixing hole 152. The stand 100 further includes a fixing member 160 extending through the fixing hole 152 and coupled to the hollow pillar 144, such that the strengthening board 150 is fixed on the latch fixing base 140. The latch 130 may further include a cushion body 138 fixed on the fastening portion 134 to abut against the first sidewall 127, the second sidewall 128, or the groove bottom 129. In this embodiment, the material of the cushion body 138 may include plastic or rubber.

Figure 11:
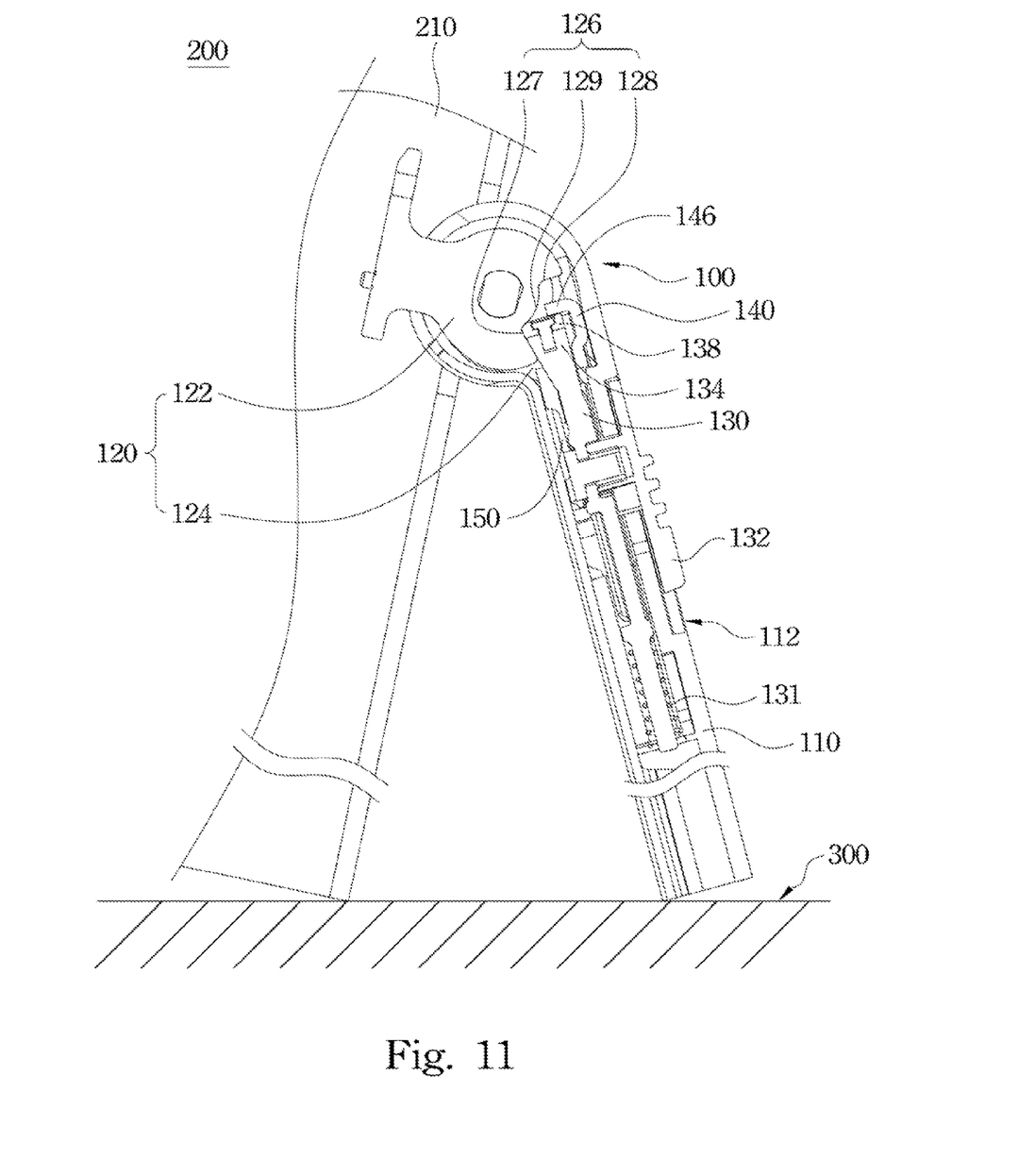
FIG. 11 is a cross sectional view of the stand for a display device shown in FIG. 10 when a fastening portion is abutted against a first sidewall.
Figure 12:
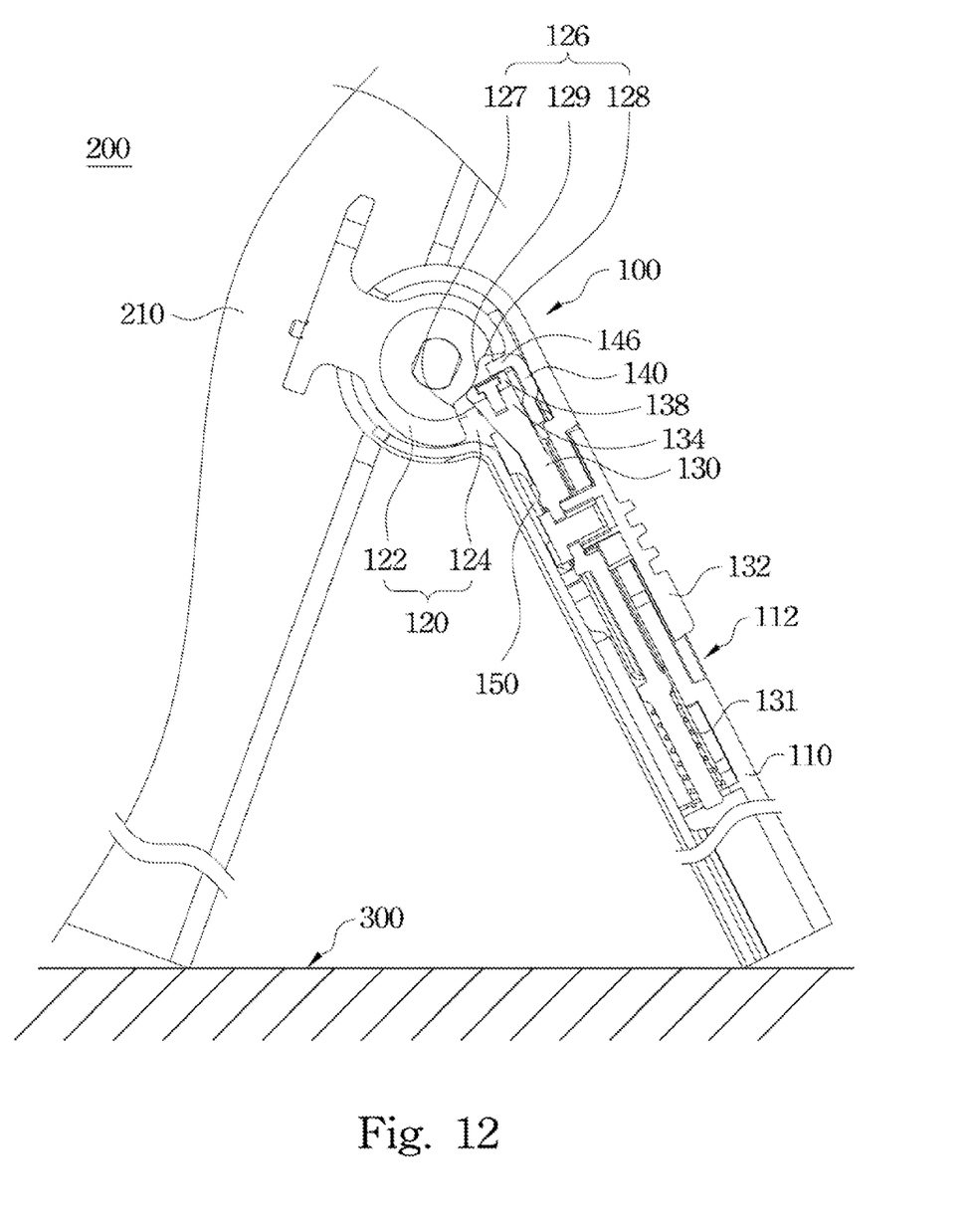
FIG. 12 is a cross sectional view of the stand for a display device shown in FIG. 10 when the fastening portion is abutted against a groove bottom.

FIG. 11 is a cross sectional view of the stand 100 for a display device shown in FIG. 10 when the fastening portion 134 is abutted against the first sidewall 127. FIG. 12 is a cross sectional view of the stand 100 for a display device shown in FIG. 10 when the fastening portion 134 is abutted against the groove bottom 129. As shown in FIG. 11 and FIG. 12, when the fastening portion 134 is located in the positioning groove 126, the stop wall 146 can abut against the latch 130 and can be moved with the latch 130 in the positioning groove 126 simultaneously. The position of the stop wall 146 located in the positioning groove 126 can be designed in accordance with practical requirements. In use, the latch 130 can be moved in the positioning groove 126 stably and precisely due to the stop wall 146 of the latch fixing base 140. Furthermore, the cushion body 138 can decrease the noise generated by friction between the fastening portion 134 and the first board 122.

The reader's attention is directed to all papers and documents which are filed concurrently with this specification and which are open to public inspection with this specification, and the contents of all such papers and documents are incorporated herein by reference.

All the features disclosed in this specification (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

What is claimed is:

1. A stand for a display device comprising:
    a housing having an accommodating groove;
    a hinge structure comprising:
        a first board fixed on a backboard of the display device and having a positioning groove; and
        two second boards rotatably connected respectively to two ends of the first board and each fixed on the housing; and
    a latch flexibly disposed on the housing and aligned with the first board, comprising:
        an operation portion exposed through the accommodating groove; and
        a fastening portion selectively engaged with the positioning groove by releasing a spring force of a spring connected to the latch, an included angle being formed between the housing and the backboard of display device when the fastening portion is engaged with the positioning groove, wherein when the operation portion is moved in a direction away from the first board, the fastening portion is disengaged from the positioning groove by compressing the spring connected to the latch, such that the housing is pivoted to a position parallel to the backboard of display device.

2. The stand as claimed in claim 1, wherein the positioning groove includes a first sidewall, a second sidewall, and a groove bottom, and when the fastening portion is located in the positioning groove, the fastening portion is selectively abutted against the first sidewall, the second sidewall, or portion of he groove bottom located between the first and second sidewalls.

3. The stand as claimed in claim 2, wherein the fastening portion has a contact surface, and the first board has an axle center, and when the contact surface is abutted against the first sidewall, the contact surface is located on a connecting line formed by the first sidewall and the axle center.

4. The stand as claimed in claim 1, wherein the length of the accommodating groove is greater than the length of the operation portion, such that the operation portion is movable in the accommodating groove.

5. The stand as claimed in claim 1, further comprising:
    a latch fixing base located between the latch and the housing and fixed on the housing, wherein the latch fixing base includes two extending wings respectively fixed on the two second boards.

6. The stand as claimed in claim 5, further comprising:
    a strengthening board fixed on the housing, such that the two second boards, the latch fixing base, and the latch are sandwiched between the strengthening board and the housing.

7. The stand as claimed in claim 6, wherein the latch fixing base comprises a hollow pillar, the strengthening board has a fixing hole, and the hollow pillar is aligned with the fixing hole.

8. The stand as claimed in claim 7, further comprising:
    a fixing member extending through the fixing hole and coupled to the hollow pillar.

9. The stand as claimed in claim 5, wherein the latch fixing base comprises a stop wall protruding into the positioning groove for abutting against the latch.

10. The stand as claimed in claim 2 wherein the latch further comprises:
    a cushion body fixed on the fastening portion for abutting against the first side all, the second side all, or the groove bottom.

11. The stand as claimed in claim 10, wherein the material of the cushion body comprises plastic or rubber.

* * * * *